(12) United States Patent
Vining et al.

(10) Patent No.: US 12,056,075 B2
(45) Date of Patent: Aug. 6, 2024

(54) REPEATER WITH MULTIPLEXING CIRCUIT FOR UNIVERSAL ASYNCHRONOUS RECEIVER TRANSMITTER (UART) AND EMBEDDED UNIVERSAL SERIAL BUS (eUSB2)

(71) Applicant: Texas Instruments Incorporated, Dallas, TX (US)

(72) Inventors: Suzanne Mary Vining, Plano, TX (US); Win Naing Maung, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/463,697

(22) Filed: Sep. 1, 2021

(65) Prior Publication Data
US 2022/0100689 A1     Mar. 31, 2022

Related U.S. Application Data

(60) Provisional application No. 63/085,648, filed on Sep. 30, 2020.

(51) Int. Cl.
*G06F 13/42* (2006.01)
*G06F 13/40* (2006.01)

(52) U.S. Cl.
CPC ...... *G06F 13/4004* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 10,353,853 | B1* | 7/2019 | Khamesra | G06F 13/362 |
| 2011/0060850 | A1* | 3/2011 | Ko | H04W 88/06 |
| | | | | 710/15 |
| 2014/0006674 | A1* | 1/2014 | Chan | G06F 13/4221 |
| | | | | 710/313 |
| 2014/0149609 | A1* | 5/2014 | Chan | G06F 13/385 |
| | | | | 710/16 |
| 2016/0357651 | A1* | 12/2016 | Huang | G06F 11/2205 |
| 2020/0019526 | A1* | 1/2020 | Wentroble | G06F 13/4282 |
| 2020/0073839 | A1* | 3/2020 | Maung | G06F 13/382 |

* cited by examiner

*Primary Examiner* — Henry Tsai
*Assistant Examiner* — Dean Phan
(74) *Attorney, Agent, or Firm* — Valerie M. Davis; Frank D. Cimino

(57) ABSTRACT

An embedded USB2 (eUSB2) repeater includes an eUSB2 port having first and second terminals. The eUSB2 port facilitates two-way communication between the repeater and an application processor unit (APU) according to voltage level specifications for eUSB2. The repeater includes a USB port having first and second terminals. The USB port facilitates two-way communication between the repeater and a Universal Asynchronous Receiver Transmitter (UART) according to voltage level specifications for US. The repeater includes a multiplexer having an input coupled to receive a control signal. The multiplexer selectively establishes connections between the first and second terminals of the eUSB2 port and the first and second terminals of the USB port.

13 Claims, 4 Drawing Sheets

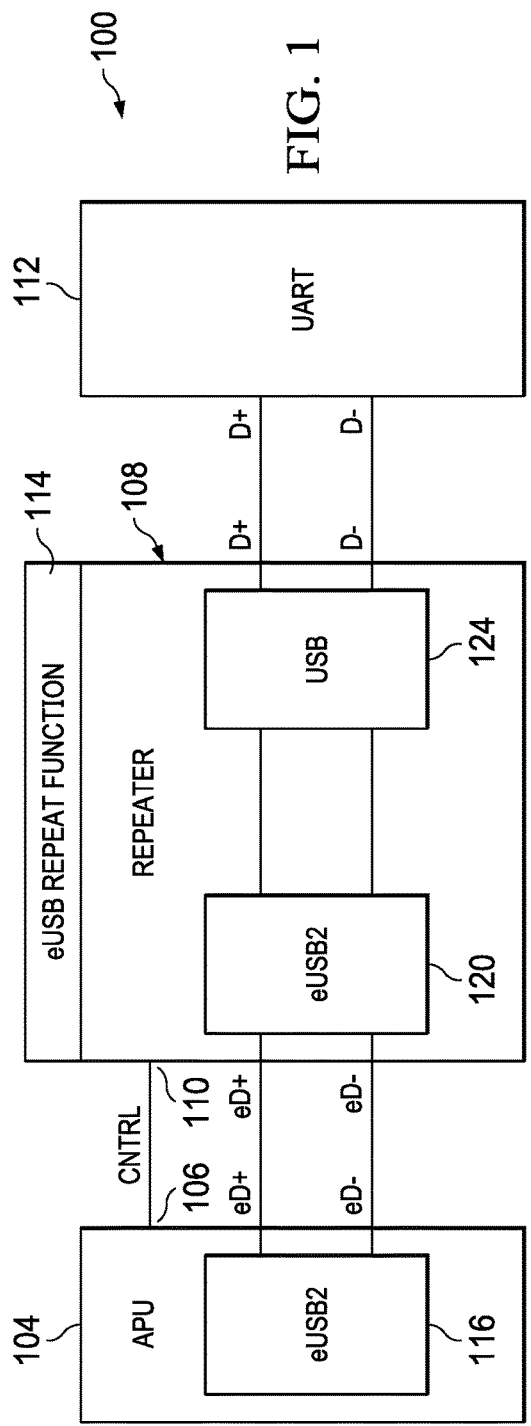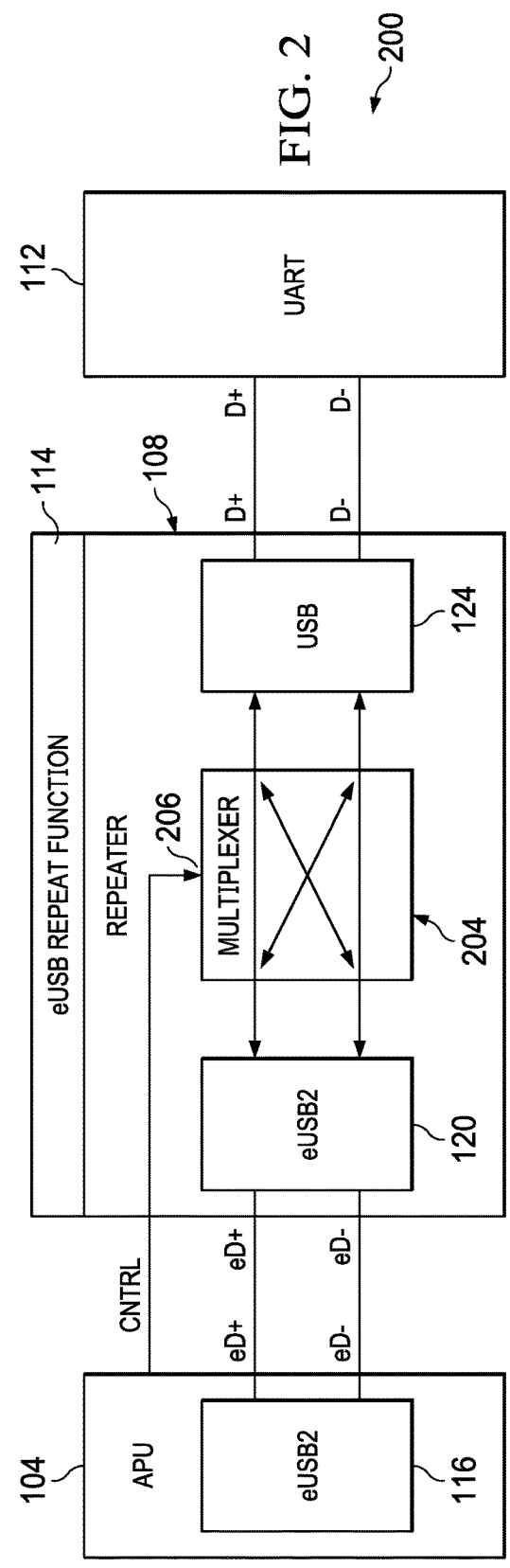

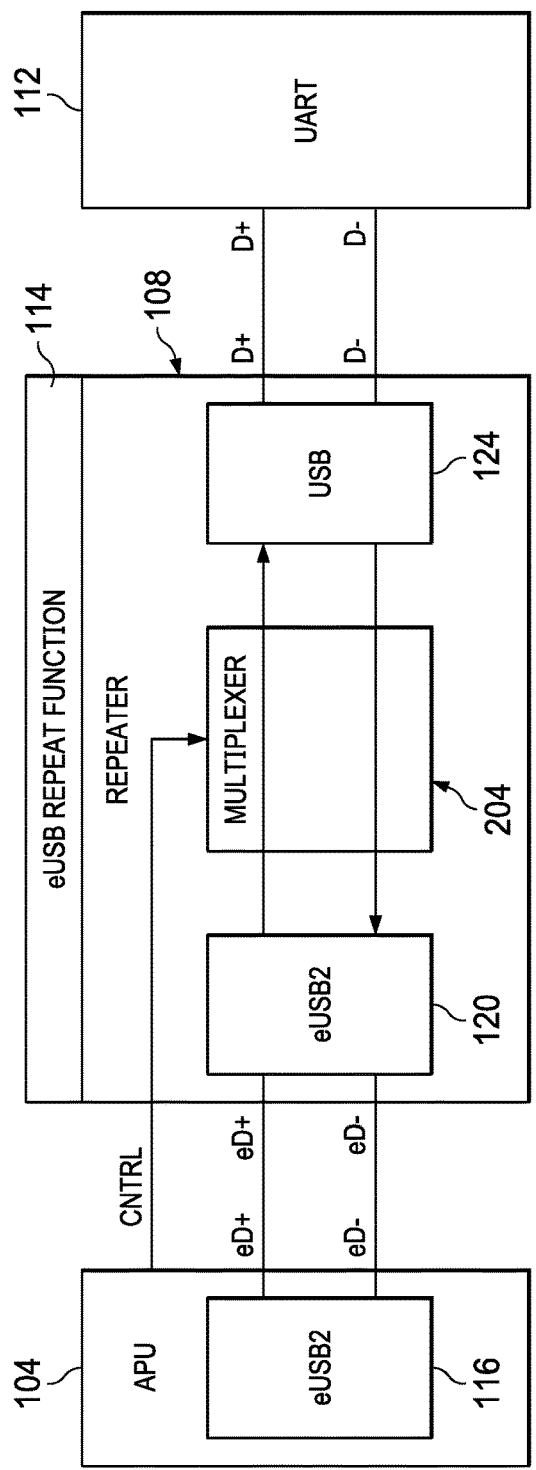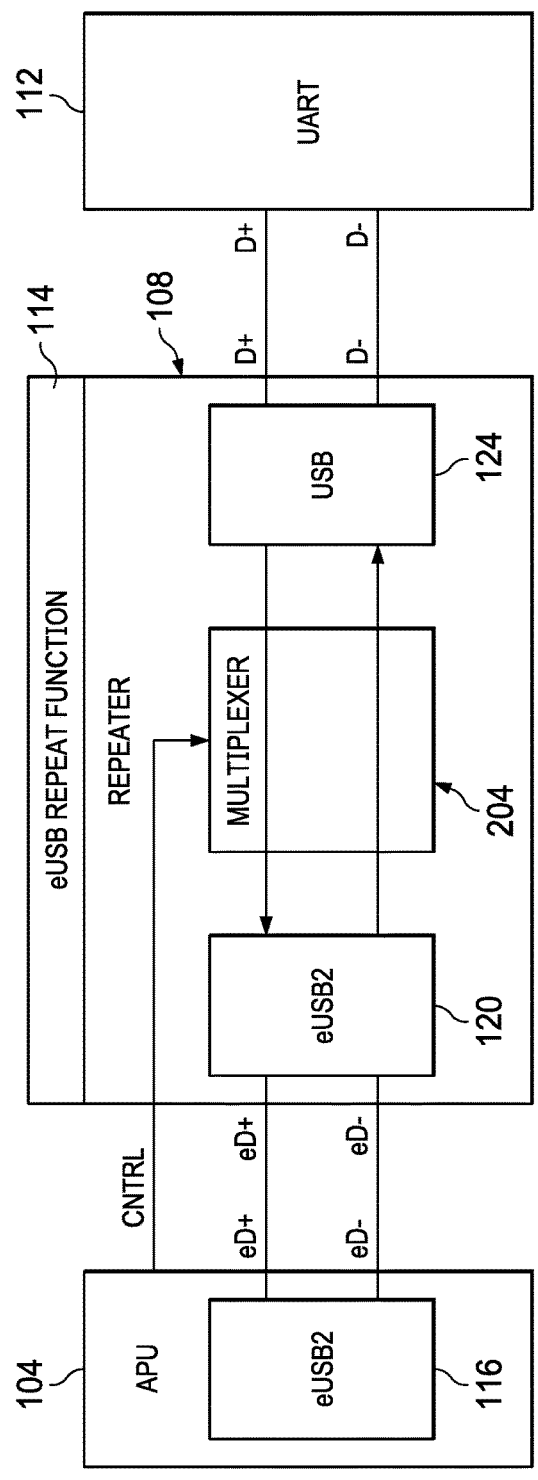

REPEATER WITH MULTIPLEXING CIRCUIT FOR UNIVERSAL ASYNCHRONOUS RECEIVER TRANSMITTER (UART) AND EMBEDDED UNIVERSAL SERIAL BUS (eUSB2)

CROSS REFERENCE TO RELATED APPLICATION

This application claims priority to U.S. Provisional Application No. 63/085,648, filed Sep. 30, 2020, entitled "Support Flexible Carkit UART Mode on eUSB2 Interface", which is hereby incorporated by reference in its entirety.

TECHNICAL FIELD

This description relates generally to UART and eUSB2 repeaters.

BACKGROUND

Universal Serial Bus (USB) is a standard establishing specifications for connectors and communication protocols. As referred to herein, USB refers to any version of the USB specification (e.g., USB 2.0, USB 3.2, USB 4.0). The USB standard is widely adopted and is also utilized as a communication protocol among individual subsystems or circuits such as a system-on-a-chip (SoC) which may include an application processor unit (APU). Such implementations in subsystems and circuits are referred to as embedded USB or eUSB2.

In SoCs, devices often operate at voltage levels that vary from those of conventional USB devices, creating an impediment to direct communication between eUSB2 systems and legacy USB systems. To facilitate communication, an eUSB2 repeater is utilized as a bridge or a redriver between eUSB2 systems and legacy USB systems, or vice versa. The eUSB2 repeater translates between legacy USB signaling voltage levels (e.g., 3.3V) and eUSB2 signaling voltage levels (e.g., 1.0V, 1.2V).

In many applications, an eUSB2 repeater may be utilized to facilitate communication between an eUSB2 device and another hardware which communicates using the universal asynchronous receiver-transmitter (UART) protocol. The UART is a widely used asynchronous, serial communication protocol. For bi-directional communication between two devices, UART relies on two wires for serial data transfer. Because the UART protocol is asynchronous, there is no clock signal to synchronize output bits from the transmitting device and the input bits at the receiving device.

For example, an eUSB2 repeater may be utilized to connect a mobile device (or any device with a downstream eUSB2 port facing a host repeater (eDSPr) or an upstream eUSB2 port facing a peripheral repeater (eUSPr) to an external UART device via a standard or proprietary USB connector. The UART device may operate using USB 2.0 Full Speed/Low Speed signaling voltage levels (3.3V). The UART device may be a computer or a single chip which debugs or updates the mobile device. The UART device may read a software program embedded in an APU inside the mobile phone through a UART interface and debug the program.

The APU generally includes an eUSB2 port which facilitates two-way communication for the APU according to voltage level specifications for eUSB2. The eUSB2 port has two terminals: a positive data terminal (eD+); and a negative data terminal (eD−). Often, depending on the manufacturer of the APU or a mobile phone, one of the terminals is designated for data transmission and the other terminal is designated for data reception. Thus, depending on the manufacturer, eD+ may be used to transmit data and eD− may be used to receive data, or eD− may be used to transmit data and eD+ may be used to receive data.

Similarly, the UART device has two terminals: a positive data terminal (D+); and a negative data terminal (D−). In some instances, depending on the manufacturer of the UART device (e.g., debugging computer), one of the terminals is designated for data transmission and the other terminal is designated for data reception. Thus, depending on the manufacturer, D+ may be used to transmit data and D− may be used to receive data, or D− may be used to transmit data and D+ may be used to receive data.

Although, UTMI+Low Pin Interface (ULPI) supports a UART mode, ULPI only allows a single direction and a single polarity for the terminals. A further drawback of ULPI is that it requires 12 pins. Thus, ULPI may not always facilitate two-way communication between an APU and a UART device.

When an eUSB2 repeater facilitates communication between an APU and a UART device, it is necessary that the eUSB2 repeater knows which terminals are designated for transmission and reception by the UART device and by the APU.

SUMMARY

In one aspect, an embedded USB2 (eUSB2) repeater includes an eUSB2 port having eD+ and eD− terminals and includes a USB port having D+ and D− terminals. The eUSB2 repeater includes a multiplexer having an input coupled to receive a control signal and in response operable to selectively establish connections between eD+ and eD− terminals of the eUSB2 port and D+ and D− terminals of the USB port. The control signal identifies one of the eD+ and eD− terminals of a first external device designated for transmitting data (TxD) to the repeater and identifies one of the eD+ and eD− terminals of a first external device designated for receiving data (RxD) from the repeater. The control signal identifies one of the D+ and D− terminals of a second external device designated for transmitting data (TxD) to the repeater and identifies one of the D+ and D− terminals of the second external device designated for receiving data (RxD) from the repeater.

In an additional aspect, the first external device is an application processor unit (APU) and the second external device is a Universal Asynchronous Receiver Transmitter.

In an additional aspect, the eUSB2 port is configured to facilitate two-way communication between the repeater and the first external device according to voltage level specifications for eUSB2, and the USB port is configured to facilitate two-way communication between the repeater and a UART according to voltage level specifications for USB.

In an additional aspect, a eUSB2 repeater includes an eUSB2 port having first and second terminals, the eUSB2 port configured to facilitate two-way communication between the repeater and an application processor unit (APU) according to voltage level specifications for eUSB2. The repeater includes a USB port having first and second terminals, the USB port configured to facilitate two-way communication between the repeater and a Universal Asynchronous Receiver Transmitter (UART) according to voltage level specifications for USB. The repeater includes a multiplexer having an input coupled to receive a control signal and in response operable to selectively establish connections between the first and second terminals of the eUSB2 port and the first and second terminals of the USB port.

In an additional aspect, the first terminal of the eUSB2 port is an eD+ terminal and the second terminal of the eUSB2 port is an eD− terminal, and the first terminal of the USB port is a D+ terminal and the second terminal of the USB port is the D− terminal.

In an additional aspect, a system includes a mobile phone including an eUSB2 port having eD+ and eD− terminals. The system includes a Universal Asynchronous Receiver Transmitter (UART) having D+ and D− terminals. The system includes an embedded USB2 (eUSB2) repeater including a multiplexer having an input coupled to receive a control signal from the mobile phone or other product and in response operable to selectively establish connections between the eD+ and eD− terminals of the eUSB2 port of the mobile phone and the D+ and D− terminals of the UART.

In an additional aspect, an eUSB2 repeater includes an eUSB2 port having first and second terminals. The eUSB2 port facilitates two-way communication between the repeater and an application processor unit (APU) according to voltage level specifications for eUSB2. The repeater includes a first USB port having first and second terminals. The first USB port facilitates two-way communication between the repeater and a Universal Asynchronous Receiver Transmitter (UART) according to voltage level specifications for USB. The repeater includes a second USB port having first and second terminals. The second USB port facilitates two-way communication between the repeater and a USB device according to voltage level specifications for USB. The repeater includes a multiplexer having an input coupled to receive a control signal and in response selectively establishes connections between the first and second terminals of the eUSB2 port and the first and second terminals of the first USB port or between the first and second terminals of the eUSB2 port and the first and second terminals of the second USB port.

BRIEF DESCRIPTION OF THE DRAWINGS

FIG. 1 illustrates a block diagram of a system of an example embodiment.

FIG. 2 illustrates a block diagram of a system of an example embodiment including a UART multiplexer.

FIGS. 3A-3D illustrate examples of multiplexing connections by a multiplexer.

The same reference numbers or other reference designators are used in the drawings to designate the same or similar (functionally and/or structurally) features.

DETAILED DESCRIPTION

Figure 3C:
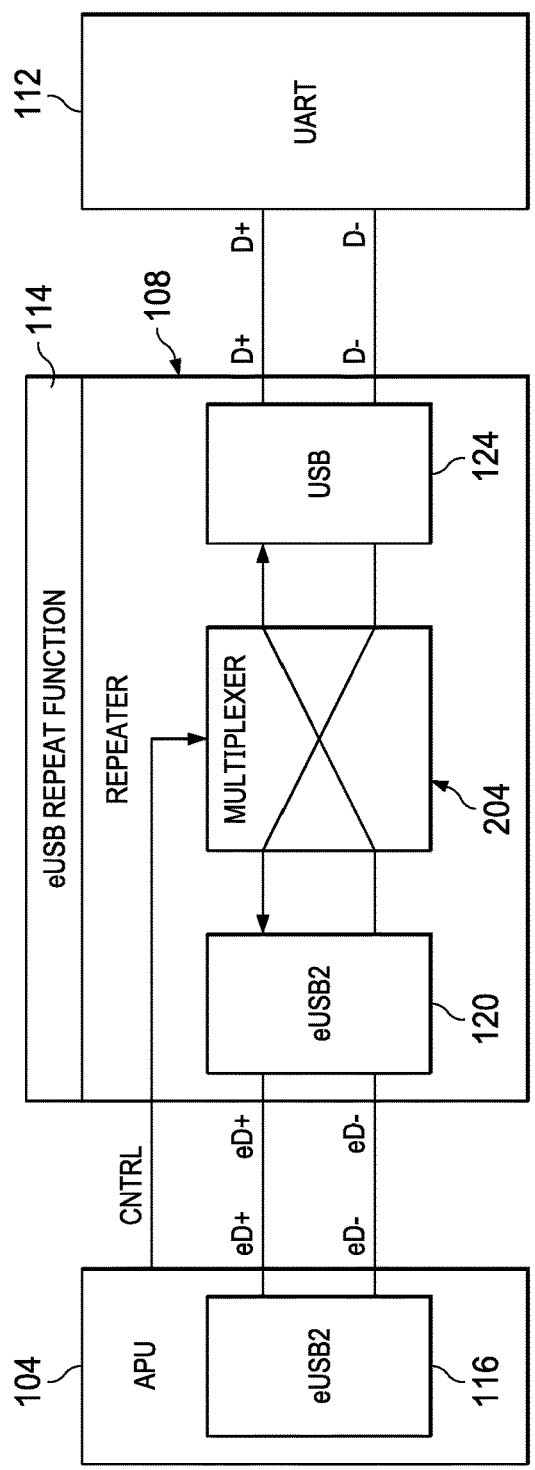

FIG. 1 illustrates a block diagram of a system 100 of an example embodiment. In at least some examples, the system 100 is illustrative of a computing device, a communication device or elements of a computing device or a communication device. The system 100 includes an application processor unit (APU) 104, an eUSB2 repeater 108, and an external device 112. The APU 104, in some examples, may be a system-on-chip (SoC) which can be an element of a mobile phone (not shown in FIG. 1). In some examples, the APU 104 can also be a microcontroller unit (MCU) or a central processor unit (CPU). The APU 104 includes an eUSB2 port 116 which has a transmitter and a receiver (not shown in FIG. 1). The eUSB2 port 116 facilitates two-way communication for the APU 104 according to voltage level specifications for eUSB2. The eUSB2 port 116 may, for example, facilitate communication between the APU 104 and the external device 112. The external device 112 may, for example, may be a peripheral device (e.g., printer, speaker) or a storage device, a host or a hub. In some examples, the external device 112 is a Universal Asynchronous Receiver Transmitter (UART) 112 which can be a computer or a single chip which debugs or updates the APU 104. The repeater 108 may facilitate bi-directional communications between the APU 104 and the UART 112, thus allowing UART debug and UART diagnostics.

The computing device 112 (that, e.g., includes UART functionality/port) may read (e.g. a software program) from or write (e.g. a software program) to the APU 104. The computing device 112 can incorporate a UART datalog port that receives messages from the APU 104.

The eUSB2 port 116 has two terminals: a positive data terminal (eD+); and a negative data terminal (eD−). Depending on the manufacturer of the APU 104, or, for example a mobile phone of which the APU 104 is an element, one of the terminals is designated for data transmission (TxD) and the other terminal is designated for data reception (RxD). Thus, depending on the manufacturer, eD+ may be used to transmit data (TxD) and eD− may be used to receive data (RxD), or eD− may be used to transmit data (TxD) and eD+ may be used to receive data (RxD).

Because SoCs such as the APU 104 often operate at voltage levels that vary from those of conventional USB devices and the UART 112, the eUSB2 repeater 108 is utilized as a bridge or redriver between the eUSB2 port 116 and the UART 112, to facilitate communications. The eUSB2 repeater 108 communicatively couples the APU 104 to the UART 112 and vice versa. For communications from APU 104 to UART 112, the repeater 108 converts the signals from the APU 104 to signals appropriate for the UART 112. For communications to APU 104 from UART 112, the repeater 108 converts the signals from the UART 112 to signals appropriate for the APU 104.

The repeater 108 includes a repeat function module 114 which translates between legacy USB signaling voltage levels (e.g., 3.3V) and eUSB2 signaling voltage levels (e.g., 1.0V, 1.2V) and between eUSB2 signaling voltage levels and USB 2.0 signaling voltage levels. The repeat function module 114 also supports operation at the detected or negotiated data rate (e.g., HS, FS, LS). The repeater 108 includes an eUSB2 port 120 which has a transmitter and a receiver (not shown in FIG. 1). The eUSB2 port 120 facilitates two-way communication between the repeater 108 and the APU 104. The eUSB2 port 120 has two terminals: a positive data terminal (eD+); and a negative data terminal (eD−). For two way communication, the respective eD+ terminals of the eUSB2 port 116 and the eUSB2 port 120 of repeater 108 are connected, and the respective eD− terminals of the eUSB2 116 and the eUSB2 120 are connected.

The repeater 108 includes a USB port 124 which has receivers and transmitters (not shown in FIG. 1). The USB port 124 facilitates two-way communication between the repeater 108 and the UART 112. The USB port 124 has two terminals: a positive data terminal (D+); and a negative data terminal (D−). The UART 112 also has two terminals: a positive data terminal (D+); and a negative data terminal (D−). For two way communication, the respective D+ terminals of the UART 112 and the USB port 124 of the repeater 108 are connected, and respective the D− terminals of the UART 112 and the USB port 124 of the repeater 108 are connected. The direction of data flow between the APU 104 and the UART 112 is sometimes referred to as the carkit direction and the direction between the UART 112 and the APU 104 is sometimes referred to as the reverse carkit direction.

Depending on the manufacturer of the APU 104, or a mobile phone of which the APU 104 is an element of, one of the D+ and D− terminals is designated for data transmission and the other terminal is designated for data reception. Thus, depending on the manufacturer, eD+ may be used to transmit data (TxD) and eD− may be used to receive data (RxD), or eD− may be used to transmit data (TxD) and eD+ may be used to receive data (RxD). Similarly, depending on the manufacturer of the UART 112, one of the D+ and D− terminals is designated for data transmission and the other terminal is designated for data reception.

In an example embodiment, the APU 104 provides a control signal CNTRL via an output 106. The control signal CNTRL identifies the terminal (eD+ or eD−) designated for transmitting data (TxD) from the eUSB2 port 116 and the terminal (eD+ or eD−) designated for receiving data (RxD) by the eUSB2 port 116. Since the UART 112 needs to be compatible with the APU 104 in order to be able to debug/update the APU 104, the terminals designated by the UART 112 for TxD and RxD are generally standardized and are known to the APU 104. The control signal CNTRL also identifies the terminal (D+ or D−) designated for transmitting data (TxD) from the UART 112 and the terminal (D+ or D−) designated for receiving data (RxD) by the UART 112. The control signal CNTRL may, for example, be 2-bit wide data [1:0] which identifies the terminals designated for TxD and RxD by the APU 104 and by the UART 112.

The repeater 108 also knows the carkit standard and defaults to it. The repeater 108 allows for routing and direction flexibility between the USB connector and the SoC, with direction multiplexing. Therefore, the control signal CNTRL is provided by the APU 104 to indicate the appropriate terminals designated for TxD and RxD to the repeater 108.

The repeater 108 receives the control signal CNTRL at an input 110. The repeater 108 includes a 2×2 multiplexer (not shown in FIG. 1), in some embodiments, which connects its eD+ terminal to one of its D+ and D− terminals and connect its eD− terminal to the other of its D+ and D− terminals in order to establish communication paths between the terminal designated by the APU 104 for TxD to the terminal designated by the UART 112 for RxD and to establish a path between the terminal designated by the UART 112 for TxD to the terminal designated by the APU 104 for RxD. As a result, transmitted data from the APU 104 is received by the UART 112 at the designated receiving terminal, and transmitted data from the UART 112 is received by the APU 104 at the designated receiving terminal.

FIG. 2 illustrates a block diagram of a system 200 of an example embodiment. The system 200 includes the APU 104, the repeater 108, and the UART 112. The repeater 108 includes the repeat function module 114 which translates between legacy USB signaling voltage levels (e.g., 3.3V) and terminations and eUSB2 signaling voltage levels (e.g., 1.0V, 1.2V). The repeat function module 114 also supports operation at the detected or negotiated data rate (e.g., HS, FS, LS). The repeater 108 includes a multiplexer 204 which selectively establishes connection between the eD+ and eD− terminals of the eUSB2 port 120 and the D+ and D− terminals of the USB port 124. The multiplexer 204 can be configured as a 2×2 cross-point switch. The multiplexer 204 receives a control signal CNTRL at an input 206, and in response the multiplexer 204 selectively establishes connections between eD+/eD− terminals of the eUSB2 port 120 and D+/D− terminals of the USB port 124. For example, in response to the control signal CNTRL, the multiplexer 204 can connect the eD+ terminal to one of the D+ and D− terminals of the repeater 108. Similarly, in response to the control signal CNTRL, the multiplexer 204 can connect the eD− terminal to one of the D+ and D− terminals of the repeater. By multiplexing connections between eD+/eD− and D+/D−, the multiplexer 204 connects the terminal designated by the APU 104 for TxD to the terminal designated by the UART 112 for RxD and connects the terminal designated by the UART 112 for TxD to the terminal designated by the APU 104 for RxD. As a result, transmitted data from the APU 104 is received by the UART 112 at the designated receiving terminal, and transmitted data from the UART 112 is received by the APU 104 at the designated receiving terminal.

FIG. 3A illustrates a first example scenario of multiplexing connections by the multiplexer 204. For example, the control signal CNTRL provided by the APU 104 is [1,1] which indicates the following: eD+ and eD− of the APU 104 are designated for TxD and RxD, respectively; and D+ and D− of the UART 112 are designated for RxD and TxD, respectively. Accordingly, the multiplexer 204 connects eD+ of the APU 104 to D+ of the UART 112, and connects eD− of the APU 104 to D− of the UART 112. As a result, data transmitted by the APU 104 via eD+ is received by the UART 112 at D+, and data transmitted by the UART 112 via D+ is received by the APU 104 at eD−.

FIG. 3B illustrates a second example scenario of multiplexing connections by the multiplexer 204. For example, the control signal CNTRL provided by the APU 104 is [0, 0] which indicates the following: eD+ and eD− of the APU 104 are designated for RxD and TxD, respectively; and D+ and D− of the UART 112 are designated for TxD and RxD, respectively. Accordingly, the multiplexer 204 connects eD+ of the APU 104 to D+ of the UART 112, and connects eD− of the APU 104 to D− of the UART 112. As a result, data transmitted by the UART 112 via D+ is received by the APU 104 at eD+, and data transmitted by the APU 104 via eD+ is received by the UART 112 at D−.

FIG. 3C illustrates a third example scenario of multiplexing connections by the multiplexer 204. For example, the control signal CNTRL provided by the APU 104 is [0, 1] which indicates the following: eD+ and eD− of the APU 104 are designated for RxD and TxD, respectively; and D+ and D− of the UART 112 are designated for RxD and TxD, respectively. Accordingly, the multiplexer 204 connects eD+ of the APU 104 to D− of the UART 112, and connects eD− of the APU 104 to D+ of the UART 112. As a result, data transmitted by the UART device 112 via D− is received by the APU 104 at eD+, and data transmitted by the APU 104 via eD− is received by the UART 112 at D+. In this example, the multiplexer forms a cross-connection.

Figure 3D:
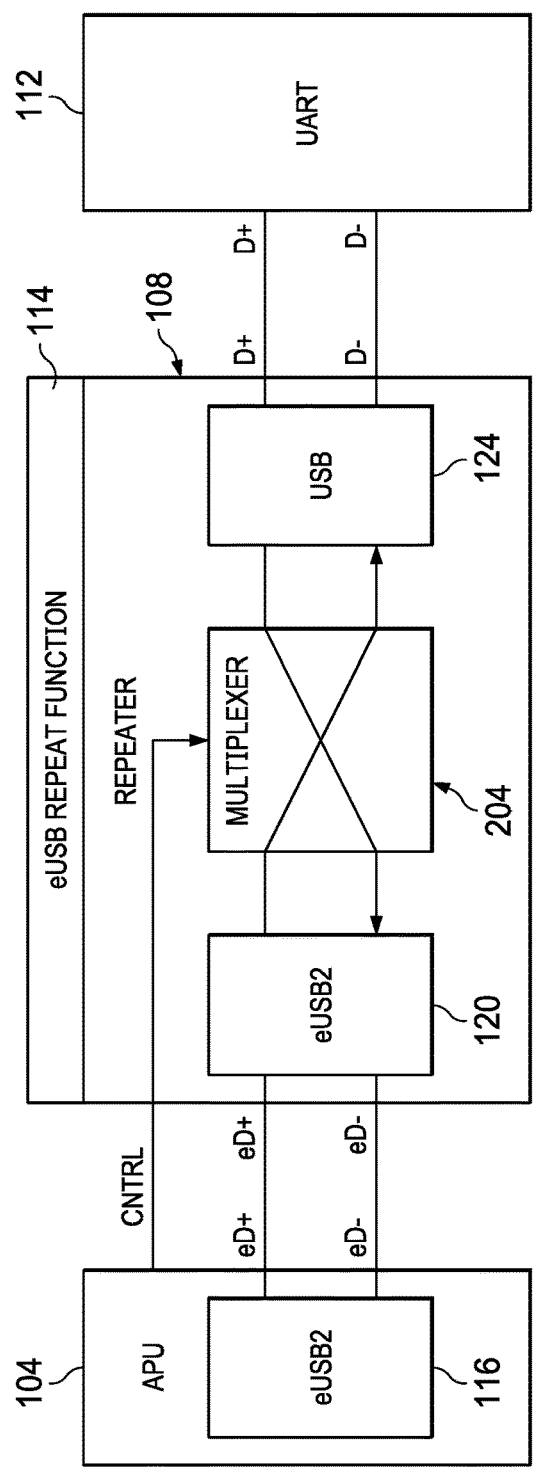

FIG. 3D illustrates a fourth example scenario of multiplexing connections by the multiplexer 204. For example, the control signal CNTRL provided by the APU 104 is [1, 0] which indicates the following: eD+ and eD− of the APU 104 are designated for TxD and RxD, respectively; and D+ and D− of the UART 112 are designated for TxD and RxD, respectively. Accordingly, the multiplexer 204 connects eD+ of the APU 104 to D− of the UART 112, and connects eD− of the APU 104 to D+ of the UART 112. As a result, data transmitted by the UART device 112 via D+ is received by the APU 104 at eD−, and data transmitted by the APU 104 via eD+ is received by the UART 112 at D−. In this example, the multiplexer forms a cross-connection.

In an example embodiment, the 2-bit control signal CNTRL may reside in a register (not shown) inside the APU 104. The register may be initialized from a non-volatile memory. In other embodiments, the control signal CNTRL may be stored in any type of transitory memory.

Figure 4:
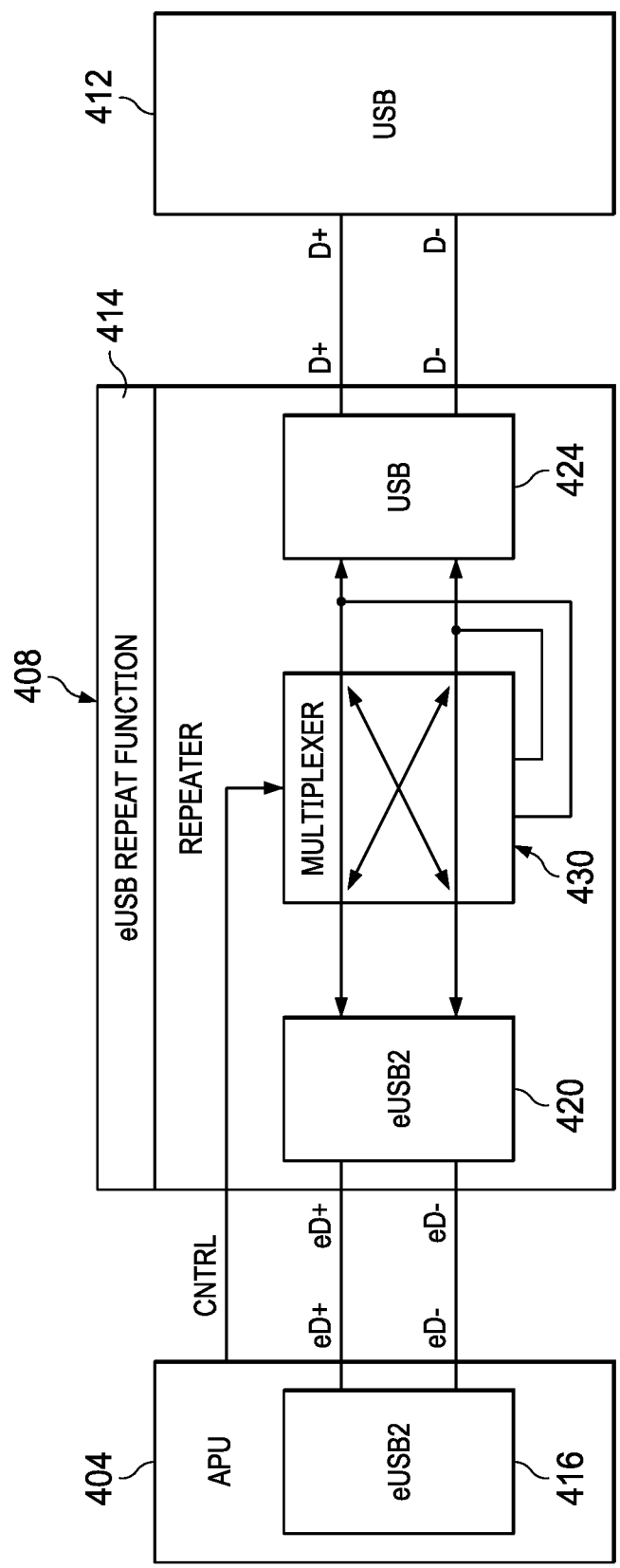
FIG. 4 is a block diagram of a system of another example embodiment.

FIG. 4 is a block diagram of a system 400 of another example embodiment. The system 400 includes an APU 404 and an eUSB2 repeater 408. The repeater 408 can facilitate two way communication between the APU 404 and a device 412 (e.g. a device that uses a UART protocol or a device that uses a standard USB protocol) as shown in FIG. 4. In some example embodiments, APU 404 may be implemented similarly to APU 104 and port 416 may be implemented similarly as port 116.

The APU 404 includes an eUSB2 port 416 which facilitates two-way communication for the APU 404 according to voltage level specifications for eUSB2. The eUSB2 port 416 may, for example, facilitate communication between the APU 404 and the device 412. The device 412 may, for example, may be peripheral device (e.g., printer, speaker), a storage device, a computing device, a mobile device, a host or a hub.

The repeater 408 communicatively couples the APU 404 to the device 412 and vice versa. The repeater 408 includes the repeat function module 414 which may be implemented similarly to repeat function module 114 and translates between legacy USB signaling voltage levels (e.g., 3.3V) and eUSB2 signaling voltage levels (e.g., 1.0V, 1.2V) and eUSB2 and USB 2.0 terminations through various serial sequences. The repeat function module 414 also supports operation at the detected or negotiated data rate (e.g., HS, FS, LS). The repeater 108 converts signals appropriate for the APU 404 to signals appropriate for the device 412 and vice versa. The repeater 408 includes an eUSB2 port 420 (which, in some example embodiments, may be implemented similarly as port 120) to facilitate two-way communication between the repeater 408 and the APU 404. The repeater 408 includes a USB port 424 (which, in some example embodiments, may be implemented similarly as port 124) to facilitate two-way communication between the APU 404 and the USB 412.

If the device 412 is a standard USB device, which is not a UART device, the terminals designated by the device 412 are half duplex, not dual simplex as for a UART. Thus, the multiplexer 430 is bypassed when a non-UART device is coupled to the D+ and D− terminals of the repeater 408. In an example embodiment, in response to a control signal CNTRL indicating that a standard USB device is coupled to the D+ and D− terminals of the repeater 408, the multiplexer 430 is bypassed, and the eD+ and eD− terminals of the eUSB2 port 420 are indirectly coupled to the respective D+ and D− terminals of the USB port 424, thus establishing two way communication between the APU 404 and the USB 412. For example, the control signal CNTRL may be 3-bit wide data [2:0] to allow for the indication that a standard USB device (not a UART device) is coupled to the repeater. In an alternative embodiment, if device 412 is a standard USB device, the control signal CNTRL has a value of [1,1] and a third bit is not need for the appropriate connection.

In this description, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A. Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronics or semiconductor component.

While certain components may be described herein as being of a particular process technology, these components may be exchanged for components of other process technologies. Circuits described herein are reconfigurable to include the replaced components to provide functionality at least partially similar to functionality available before the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in series or in parallel between the same two nodes as the single resistor or capacitor. Also, uses of the phrase "ground terminal" in this description include a chassis ground, an Earth ground, a floating ground, a virtual ground, a digital ground, a common ground, and/or any other form of ground connection applicable to, or suitable for, the teachings of this description. Unless otherwise stated, "about", "approximately", or "substantially" preceding a value means +/−10 percent of the stated value.

Modifications are possible in the described embodiments, and other embodiments are possible, within the scope of the claims.

What is claimed is:

1. An embedded USB2 (eUSB2) repeater, comprising:
an eUSB2 port having eD+ and eD− terminals;
a USB port having D+ and D− terminals; and
a multiplexer having an input, the multiplexer configured to receive, at the input, a control signal that identifies a transmit terminal and a receive terminal of a first external device and a second external device and, the multiplexer, in response to the control signal, configured to selectively couple the eD+ terminal to either one of the D+ terminal or the D− terminal and couple the eD− terminal to the other of the D+ terminal or the D− terminal, and when eD+ terminal is configured to transmits data, the one of the D+ terminal or the D− terminal which is selectively coupled to the eD+ terminal is configured to receive data, eD− terminal is configured to receive data and the other of the D+ terminal or the D− terminal which is selectively coupled to eD− terminal is configured to transmit data, and when eD+ terminal is configured to receive data, the one of the D+ terminal or the D− terminal which is selectively coupled to the eD+ terminal is configured to transmit data, eD− terminal is configured to transmit data and the other of the D+ terminal or the D− terminal which is selectively coupled to eD− terminal is configured to receive data.

2. The eUSB2 repeater of claim 1, wherein the control signal identifies one of the eD+ and eD− terminals of the first external device designated for transmitting data (TxD) to the repeater and identifies one of the eD+ and eD− terminals of a first external device designated for receiving data (RxD) from the repeater.

3. The eUSB2 repeater of claim 1, wherein the control signal identifies one of the D+ and D− terminals of the second external device designated for transmitting data (TxD) to the repeater and identifies one of the D+ and D− terminals of the second external device designated for receiving data (RxD) from the repeater.

4. The eUSB2 repeater of claim 2, wherein the first external device is an application processor unit (APU).

5. The eUSB2 repeater of claim 3, wherein the second external device is a Universal Asynchronous Receiver Transmitter.

6. The eUSB2 repeater of claim 1, wherein the eUSB2 port is configured to facilitate two-way communication between the repeater and the first external device according to voltage level specifications for eUSB2.

7. The eUSB2 repeater of claim 1, wherein the USB is configured to facilitate two-way communication between the repeater and a UART according to voltage level specifications for USB.

8. The eUSB2 repeater of claim 1, wherein the voltage level specifications for eUSB2 is between 0V and 1.32V and the voltage level specifications for USB is between 0V and 3.6V.

9. A repeater comprising:
a first port having a first terminal and a second terminal, the first terminal configured to be connected to an eD+ conductor of an embedded universal serial bus (eUSB) and the second terminal configured to be connected to an eD− conductor of the eUSB;
a second port having a third terminal and a fourth terminal, the third terminal configured to be connected to a D+ conductor of a universal serial bus (USB) or a universal asynchronous receiver transmitter (UART) device and the fourth terminal configured to be connected to a D-conductor of a USB or a UART device; and
a multiplexer coupled to the first port and the second port and configured to receive a control signal that identifies a transmit terminal and a receive terminal in the eD+ conductor, eD− conductor, D+ conductor and D− conductor, and the multiplexer, responsive to the control signal, configured to selectively couple the first terminal to either one of the third terminal or the fourth terminal and couple the second terminal to the other of the third terminal or the fourth terminal responsive to the control signal, and when eD+ conductor is configured to transmits data, the one of the D+ conductor or the D− conductor which is selectively coupled to the eD+ conductor is configured to receive data, eD− conductor is configured to receive data and the other of the D+ conductor or the D− conductor which is selectively coupled to eD− conductor is configured to transmit data, and when eD+ conductor is configured to receive data, the one of the D+ conductor or the D− conductor which is selectively coupled to the eD+ conductor is configured to transmit data, eD− conductor is configured to transmit data and the other of the D+ conductor or the D− conductor which is selectively coupled to eD− conductor is configured to receive data.

10. A system, comprising:
a first device including an embedded universal serial bus (eUSB) port having eD+ and eD−terminals;
a second device including a Universal Asynchronous Receiver Transmitter (UART) having D+ and D− terminals; and
an eUSB repeater including a multiplexer having an input configured to receive a control signal that signal identifies a transmit terminal and a receive terminal of the first and the second device and, the multiplexer, in response to the control signal, configured to selectively couple the eD+terminal to either one of the D+terminal or the D− terminal and couple the eD− terminal to the other of the D+terminal or the D− terminal, and when eD+terminal is configured to transmits data, the one of the D+terminal or the D− terminal which is selectively coupled to the eD+terminal is configured to receive data, eD− terminal is configured to receive data and the other of the D+terminal or the D− terminal which is selectively coupled to eD− terminal is configured to transmit data, and when eD+terminal is configured to receive data, the one of the D+terminal or the D− terminal which is selectively coupled to the eD+terminal is configured to transmit data, eD− terminal is configured to transmit data and the other of the D+terminal or the D− terminal which is selectively coupled to eD− terminal is configured to receive data.

11. The system of claim 10, wherein the UART is configured to debug and update the first device.

12. The system of claim 10, wherein the control signal identifies one of the eD+ and eD− terminals of the first device designated for transmitting data (TxD) to the repeater and identifies the other one of the eD+ and eD− terminals of the first device designated for receiving data (RxD) from the repeater.

13. The system of claim 10, wherein the control signal identifies one of the D+ and D− terminals of the UART designated for transmitting data (TxD) to the repeater and identifies the other one of the D+ and D− terminals of the UART designated for receiving data (RxD) from the repeater.

* * * * *